United States Patent
Bleys et al.

(10) Patent No.: US 6,806,342 B2
(45) Date of Patent: Oct. 19, 2004

(54) PROCESS FOR PREPARING A POLYURETHANE MATERIAL

(75) Inventors: Gerhard Jozef Bleys, Heverlee (BE); Eric Huygens, Heverlee (BE); Anja Vanhalle, Everberg (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/354,785

(22) Filed: Jan. 30, 2003

(65) Prior Publication Data

US 2003/0130470 A1 Jul. 10, 2003

Related U.S. Application Data

(63) Continuation of application No. PCT/EP01/07199, filed on Jun. 25, 2001.

(51) Int. Cl.[7] ............................................. C08G 18/48
(52) U.S. Cl. .......................................... 528/77; 521/176
(58) Field of Search ............................. 528/77; 521/176

(56) References Cited

U.S. PATENT DOCUMENTS

| | | | |
|---|---|---|---|
| 4,444,703 A | * | 4/1984 | Dominguez et al. ....... 264/45.3 |
| 5,418,260 A | * | 5/1995 | Smith .......................... 521/159 |
| 5,418,261 A | | 5/1995 | Helsemans et al. |
| 5,773,483 A | | 6/1998 | Eling et al. |
| 6,147,134 A | | 11/2000 | Eling |

FOREIGN PATENT DOCUMENTS

| | | |
|---|---|---|
| EP | 0 220 697 | 8/1987 |
| EP | 0 294 161 | 12/1988 |
| EP | 0 320 946 | 6/1989 |
| EP | 0 404 517 | 12/1990 |
| EP | 0 608 626 | 8/1994 |
| EP | 0 751 114 | 1/1997 |
| WO | WO 96 06875 | 6/1997 |
| WO | WO 98 00450 | 10/1999 |
| WO | WO 00/55232 | 9/2000 |

* cited by examiner

*Primary Examiner*—Rachel Gorr
(74) *Attorney, Agent, or Firm*—Nicole Graham

(57) ABSTRACT

Process for preparing a polyurethane material having no glass transition temperature below 25 C, which process involves using a polyoxyethylene polyoxypropylene polyol having a high oxyethylene content and a polyisocyanate having a high 4,4'-diphenylmethane diisocyanate (4,4'-MDI) content, wherein the reaction is conducted at an isocyanate index of 80 to 140.

16 Claims, No Drawings

PROCESS FOR PREPARING A POLYURETHANE MATERIAL

CROSS REFERENCE TO RELATED APPLICATIONS

This application is a continuation of international application PCT EP01/07199, filed Jun. 25, 2001.

FIELD OF THE INVENTION

The present invention is related to a process for preparing a polyurethane material. More specifically, the present invention is related to a process for preparing a polyurethane material using a polyoxyethylene polyoxypropylene polyol having a high oxyethylene content and a polyisocyanate having a high 4,4'-diphenylmethane diisocyanate (4,4'-MDI) content.

BACKGROUND OF THE INVENTION

The preparation of polyurethane materials having a high hardblock content from polyols having a high oxyethylene content, polyisocyanates comprising at least 85% by weight of 4,4'-MDI or a variant thereof and water has been disclosed in the prior art (i.e. WO 98/00450). The materials made are elastomers and hence show a glass transition temperature of less than 25° C. Further, it has been disclosed in the prior art (i.e. EP 608626) to produce shape memory polyurethane foams by reacting a polyisocyanate comprising a high amount of 4,4'-MDI and a polyol with a high oxyethylene content with water. The foams have a glass transition temperature above 25° C., and the amounts of chain extender and cross-linker used are relatively low, leading to products with a limited hard-block content giving products which are not as stiff as sometimes desirable.

SUMMARY OF THE INVENTION

Surprisingly, it has now been found that if a polyol is used which has a high oxyethylene content and a high level of primary hydroxyl groups together with an amount of a chain extender or cross-linker sufficient to provide a high hard block ratio, a polyurethane material is obtained which has a glass transition temperature of at least 25° C. and shows a high stiffness at a given density. The material obtained shows less surface defects (improved mixing, less bubbles) and a relatively high "ductility" (i.e. not brittle). The combination of ingredients used for making these materials show a good wetting of fibrous materials and in particular of glass fibres which makes the process particularly suitable for reaction injection moulding (RIM), especially for reinforced RIM (RRIM) and structural RIM (SRIM).

DETAILED DESCRIPTION

Therefore, the present invention is concerned with a process for preparing a polyurethane material having no glass transition temperature below 25° C., which process comprises reacting a polyisocyanate and an isocyanate-reactive composition, optionally in the presence of water in an amount of less than 5% by weight on the below isocyanate-reactive composition, wherein the reaction is conducted at an isocyanate index of 80 to 140, the polyisocyanate consists of a) 80–100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant is liquid at 25° C. and has an NCO value of at least 20% by weight (polyisocyanate a), and b) 20–0% by weight of another polyisocyanate (polyisocyanate b), and wherein the isocyanate-reactive composition consists of a) 80–100% by weight of a polyether polyol having an average nominal functionality of 3–8, an average equivalent weight of 200–2000, an average molecular weight of 600–8000, an oxyethylene (EO) content of 50–100% and preferably of 75–100% by weight and a primary hydroxyl content of 70–100% calculated on the number of primary and secondary hydroxyl groups in the polyol, b) an isocyanate-reactive chain extender and/or cross linker in an amount such that the hard block ratio is 0.60 or more and preferably at least 0.65 and c) 20–0% by weight of one or more other isocyanate-reactive compounds excluding water, the amount of polyol a) and isocyanate-reactive compound c) being calculated on the total amount of this polyol a) and compound c).

The materials prepared according to the present invention have no glass transition temperature, Tg, below 25° C. and preferably not below 60° C. The Tg is defined as the temperature at which the tan δ curve reaches its maximum value as measured by Dynamic Mechanical Thermal Analysis (DMTA) at 1 Hz and a heating rate of 3° C./min).

In the context of the present invention, the following terms have the following meaning:

1) isocyanate index or NCO index or index: the ratio of NCO-groups over isocyanate-reactive hydrogen atoms present in a formulation, given as a percentage $$\frac{[NCO] \times 100}{[active\ hydrogen]} (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the elastomer involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The expression "polyurethane material" as used herein refers to cellular or non-cellular products as obtained by reacting polyisocyanates with isocyanate-reactive hydrogen containing compounds, optionally using foaming agents, and in particular includes cellular products obtained with water as reactive foaming agent (involving a reaction of water with isocyanate groups yielding urea linkages and carbon dioxide and producing polyurea-urethane foams) and with polyols, aminoalcohols and/or polyamines as isocyanate-reactive compounds.

5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

7) The term "hard block ratio" refers to the amount (in pbw) of polyisocyanate+isocyanate-reactive materials having a molecular weight of 500 or less (wherein polyols having a molecular weight of more than 500 incorporated in the polyisocyanates are not taken into account) divided by the amount (in pbw) of all polyisocyanate+all isocyanate-reactive materials used.

8) The glass transition temperature is measured according to Dynamic Mechanical Thermal Analysis (DMTA) according to ISO/DIS 6721-5 at 3° C./min.

Preferably, the polyisocyanate a) is selected from 1) a diphenylmethane diisocyanate comprising at least 40%, preferably at least 60% and most preferably at least 85% by weight of 4,4'-diphenylmethane diisocyanate and the following preferred variants of such diphenylmethane diisocyanate: 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2–4 and an average molecular weight of at most 1000; 4) a prepolymer having an NCO value of 20% by weight or more and which is the reaction product of an excess of any of the aforementioned polyisocyanates 1–3) and of a polyol having an average nominal functionality of 2–6, an average molecular weight of 2000–12000 and preferably an hydroxyl value of 15 to 60 mg KOH/g, and 5) mixtures of any of the aforementioned polyisocyanates. Polyisocyanates 1), 2), 3) and mixtures thereof are preferred. Polyisocyanate 1) comprises at least 40% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI.

It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available (for example SUPRASEC™ MPR isocyanate, which is available from Huntsman International LLC (who owns the Suprasec trademark)).

The carbodiimide and/or uretonimine modified variants of the above polyisocyanate 1) are also known in the art and commercially available (e.g. SUPRASEC 2020 isocyanate).

Urethane modified variants of the above polyisocyanate 1) are also known in the art, see e.g. The ICI Polyurethanes Book by G. Woods 1990, $2^{nd}$ edition, pages 32–35. Aforementioned prepolymers of polyisocyanate 1) having an NCO value of 20% by weight or more are also known in the art. Preferably, the polyol used for making these prepolymers is selected from polyester polyols and polyether polyols and especially from polyoxyethylene polyoxypropylene polyols having an average nominal functionality of 2–4, an average molecular weight of 2500–8000, and preferably an hydroxyl value of 15–60 mg KOH/g and preferably either an oxyethylene content of 5–25% by weight, which oxyethylene preferably is at the end of the polymer chains, or an oxyethylene content of 50–90% by weight, which oxyethylene preferably is randomly distributed over the polymer chains.

Mixtures of the aforementioned polyisocyanates may be used as well, see e.g. The ICI Polyurethanes Book by G. Woods 1990, $2^{nd}$ edition pages 32–35. An example of such a commercially available polyisocyanate is SUPRASEC 2021 isocyanate (available from Huntsman Polyurethanes).

The other polyisocyanate b) may be chosen from aliphatic, cycloaliphatic, araliphatic and, preferably, aromatic polyisocyanates, such as toluene diisocyanate in the form of its 2,4 and 2,6-isomers and mixtures thereof and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate and polymethylene polyphenylene polyisocyanates may be used as well.

If prepolymers, having an NCO value of 20% by weight made from polyols having a molecular weight of 2000–12000, are used, the amount of these polyols in the prepolymers compared to the total amount of polyols having such molecular weight used in making the polyurethane material is preferably less than 50% and more preferably less than 30% by weight.

Polyol 1) having a high EO content and a high primary hydroxyl content is selected from those having an EO content of 50–100% and preferably 75–100% by weight calculated on the weight of the polyether polyol and a primary hydroxyl content of 70–100% and preferably of 80–100% calculated on the number of primary and secondary hydroxyl groups in the polyol. These polyether polyols may contain other oxyalkylene groups like oxypropylene and/or oxybutylene groups. These polyols have an average nominal functionality of 3–8 and more preferably of 3–6, an average equivalent weight of 200–2000 and preferably of 200–1800 and a molecular weight of 600–8000, preferably of 600–5000. As long as there are sufficient oxyethylene groups at the end of the polymer chains so as to meet the requirement of the primary hydroxyl content the distribution of the oxyethylene and other oxyalkylene groups (if present) over the polymer chains may be of the type of a random distribution, a block copolymer distribution or a combination thereof. Mixtures of polyols may be used. Methods to prepare such polyols are known and such polyols are commercially available; examples are CARADOL™ 3602 polyol from Shell, LUPRANOL™ 9205 polyol from BASF, DALTOCEL F526 polyol from Huntsman Polyurethanes (DALTOCEL is a trademark of Huntsman International LLC) and G2005 from Uniqema.

The isocyanate-reactive chain extenders, which have a functionality of 2, may be selected from amines, aminoalcohols and polyols; preferably polyols are used. Further, the chain extenders may be aromatic, cycloaliphatic, araliphatic and aliphatic; preferably aliphatic ones are used. The chain extenders have a molecular weight of 500 or less.

Most preferred are aliphatic diols having a molecular weight of 62–500, such as ethylene glycol, 1,3-propanediol, 2-methyl-1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 2,2-dimethyl-1,3-propanediol, diethylene glycol, dipropylene glycol and tripropylene glycol, and propoxylated and/or ethoxylated products thereof. The cross-linkers are isocyanate-reactive compounds having an average molecular weight 500 or less and a functionality of 3–8. Examples of such cross-linkers are glycerol, trimethylolpropane, pentaerythritol, sucrose, sorbitol, mono-, di- and triethanolamine, ethylenediamine, toluenediamine, diethyltoluene diamine, polyoxyethylene polyols having an average nominal functionality of 3–8 and an average molecular weight of 500 or less like ethoxylated glycerol, trimethylol propane, pentaerythritol, sucrose and sorbitol having said molecular weight, and polyether diamines and triamines having an average molecular weight below 500; most preferred cross-linkers are the polyol cross-linkers.

The amount of chain extenders and/or cross-linkers used is such that the hard block ratio is 0.60 or more and preferably at least 0.65.

The other isocyanate-reactive compounds, which may be used in an amount of 0–20% by weight and preferably of 0–10% by weight, may be selected from polyether polyamines, polyester polyols and polyether polyols (different from the above described ones) having a molecular weight of more than 500 and in particular from such other polyether polyols, which may be selected from polyoxyethylene polyols, polyoxypropylene polyols, polyoxyethylene polyoxypropylene polyols having an oxyethylene content of less than 50% by weight and polyoxyethylene polyoxypropylene polyols having a primary hydroxyl content of less than 70%. Preferred polyoxyethylene polyoxypropylene polyols are those having an oxyethylene content of 5–30% and preferably 10–25% by weight, wherein all the oxyethylene groups are at the end of the polymer chains (so-called EO-capped polyols) and those having an oxyethylene content of 60–90% by weight and having all oxyethylene groups and oxypropylene groups randomly distributed and a primary hydroxyl content of 20–60%, calculated on the number of primary and secondary hydroxyl groups in the polyol. Preferably, these other polyether polyols have an average nominal functionality of 2–6, more preferably 2–4 and an average molecular weight of 2000–10000, more preferably of 2500–8000.

Still further, the other isocyanate-reactive compounds may be selected from polyesters, polyesteramides, polythioethers, polycarbonates, polyacetals, polyolefins or polysiloxanes. Polyester polyols which may be used include hydroxyl-terminated reaction products of dihydric alcohols such as ethylene glycol, propylene glycol, diethylene glycol, 1,4-butanediol, neopentyl glycol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures.

Polythioether polyols, which may be used, include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or teraethylene glycol with diaryl carbonates, for example diphenyl carbonate, or with phosgene. Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated butadiene homo- and copolymers and suitable polysiloxane polyols include polydimethylsiloxane diols.

Mixtures of the aforementioned other isocyanate-reactive compounds may be used as well. Preferably the other isocyanate-reactive compounds are polyols selected from the above preferred ones.

The polyols may comprise dispersions or solutions of addition or condensation polymers in polyols of the types described above. Such modified polyols, often referred to as "polymer polyols" have been fully described in the prior art and include products obtained by the in situ polymerisation of one or more vinyl monomers, for example styrene and/or acrylonitrile, in the above polyether polyols, or by the in situ reaction between a polyisocyanate and an amino- and/or hydroxy-functional compound, such as triethanolamine, in the above polyol. Polyoxyalkylene polyols containing from 1 to 50% of dispersed polymer are particularly useful. Particle sizes of the dispersed polymer of less than 50 microns are preferred.

During the last years, several methods have been described to prepare polyether polyols having a low level of unsaturation. These developments have made it possible to use polyether polyols at the higher end of the molecular weight range since such polyols can now be prepared with an acceptably low level of unsaturation. According to the present invention, polyols having a low level of unsaturation may be used as well.

Still further, the following optional ingredients may be used: catalysts enhancing the formation of urethane bonds like tin catalysts like tin octoate and dibutyltindilaurate, tertiary amine catalysts like triethylenediamine and imidazoles like dimethylimidazole and other catalysts like maleate esters and acetate esters; surfactants; foam stabilisers like siloxane-oxyalkylene copolymers; fire retardants; smoke suppressants; UV-stabilizers; colorants; microbial inhibitors; organic and inorganic fillers and internal mould release agents. Further, external mould release agents may be used. A particularly preferred class of catalyst is an alkali metal or alkaline earth metal carboxylate salt. The catalyst may be a salt of any metal of Groups IA and IIA of the Periodic Table but in general the alkali metal salts are preferred like potassium and sodium salts, especially the potassium salts. If desired mixtures of such salts may be used like a mixture of a potassium and a sodium salt.

A catalytically effective amount of the salt will usually be in the range of 0.1 to 10, preferably 0.2–5 parts by weight per 100 parts by weight of reactants.

Although other polyurethane catalysts may be used together with the carboxylate salt catalysts, like the generally known tertiary amine catalysts and tin catalysts, it is preferred that the materials are made in the absence of other catalysts in particular in the absence of tertiary amine and tin catalysts.

The carboxylate may be selected from aliphatic carboxylates having 2–10 carbon atoms like acetate, hexanoate, 2-ethylhexanoate and octanoate. Especially, the carboxylate may be selected from those having the formula R—E—A—COO—, wherein A is a hydrocarbon diradical having 1–6 preferably 1–3 carbon atoms;

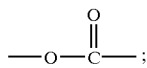

E is —O— or and

R is X—R$_1$—(OR$_2$)$_n$— wherein X is CH$_3$— or OH—, R1 is a hydrocarbon diradical having 1–8 and preferably 1–4 carbon atoms, R2 is a hydrocarbon diradical having 2–4 and preferably 2 or 3 carbon atoms and n is 0 to 10, preferably 0–5.

A may be selected from diradicals like —CH$_2$—, —CH$_2$CH$_2$—, —CH$_2$CH$_2$CH$_2$—, —CH=CH—CH$_2$—, —CH$_2$—CH—CH$_3$, —CH=CH—, —CH=C—CH$_3$ and CH$_2$=C—CH$_2$—. The most preferred diradical is —CH=CH— or —CH$_2$—C=CH$_2$ R$_1$ may be selected from those diradicals mentioned for A and from radicals obtained by removing two hydrogen atoms from e.g. butane, pentane, hexane and octane. The most preferred radicals for R$_1$ are methylene, ethylene, trimethylene, tetramethylene and propylene.

R$_2$ may be selected from ethylene, trimethylene, tetramethylene, ethylethylene and propylene. Most preferred groups are ethylene and propylene.

Such catalysts and their preparation are known as such, see EP 294161, EP 220697 and EP 751114.

Examples of catalysts are sodium acetate, potassium acetate, potassium hexanoate, potassium 2-ethylhexanoate, potassium ethoxyacetate, sodium ethoxyacetate, the potassium salt of the hemi-ester of maleic acid and ethoxyethane, ethoxyethoxyethane, ethylene glycol, diethylene glycol, triethylene glycol, tetraethylene glycol, propylene glycol, dipropylene glycol, tripropylene glycol, methanol, ethanol, propanol or butanol and the potassium salt of the hemi-ester of such hydroxy containing compounds with malonic, succinic, glutaric, adipic or fumaric acid. Mixtures of these catalysts may be used as well.

The polyurethane material may be a solid or blown (microcellular) material. Microcellular materials are obtained by conducting the reaction in the presence of a blowing agent, like hydrocarbons, hydrofluorocarbons, hydrochlorofluorocarbons, gases like N$_2$ and CO$_2$, and water. Most preferably water is used as the blowing agent. The amount of blowing agent will depend on the desired density. The amount of water will be less than 5, preferably less than 3 and most preferably less than 1% by weight; calculated on the weight of the isocyanate-reactive composition.

The reaction to prepare the material is conducted at an NCO index of 80–140 and preferably of 90–130 and most preferably of 90–110.

The density of the materials is higher than 25 kg/m$^3$ and preferably higher than 50 kg/m$^3$ and more preferably higher than 500 kg/m$^3$.

The materials are preferably made in a mould. The process may be conducted in any type of mould known in the art. Examples of such moulds are the moulds commercially used for making polyurethane shoe soles, automotive parts, like arm-rests, door panels and back-shelves. Preferably the reaction is conducted in a closed mould. The ingredients used for making the material are fed into the mould at a temperature of from ambient temperature up to 80° C. and preferably up to 70° C., the mould being kept at a temperature of from ambient temperature up to 80° C. and preferably up to 70° C. during the process. Demoulding time is relatively short despite the fact that preferably no isocyanate-reactive compounds, containing amine groups, are used; depending on the amount of catalyst demould times may be below 10 minutes, preferably below 5 minutes, more preferably below 3 minutes and most preferably below 1 minute.

The moulding process may be conducted according to the reaction injection moulding (RIM) process and the cast moulding process. In particular, the process is conducted according to RRIM and SRIM process.

In general, the isocyanate-reactive ingredients are premixed, optionally together with the optional ingredients, before being brought into contact with the polyisocyanate.

The materials according to the invention are particularly suitable for use in applications where high stiffness, non-brittle, high impact resistant and low density materials are desirable, like shoe soles and automotive parts like arm-rests, doorpanels, back-shelves and sun visors.

The present invention is illustrated by the following examples.

EXAMPLES

Examples 1 and 2

The following ingredients were bench mixed (amounts in parts by weight) and poured in an aluminium mould (20× 15×1.5 cm), which was subsequently closed. The ingredients were allowed to react and a polyurethane material according to the present invention was obtained having the following properties:

| Example | 1 | 2 |
| --- | --- | --- |
| CARADOL SA 3602 polyol | 26.81 | — |
| Polyol 1 | — | 26.89 |
| 1,4-butanediol | 15.11 | 12.78 |
| DABCO EG catalyst | 0.3 | 0.1 |
| Polyisocyanate | 57.78 | 60.23 |
| Hardblock ratio, % | 72.9 | 73 |
| Density, kg/m3 (DIN 53420) | 929 | 957 |
| Shore D(DIN 53505) | 70 | 77 |
| Tg, ° C. (Ihz, 3° C./min DMTA) | 70 | 87 |

The polyols used were not dried before use and likely have contained a minor amount of residual water, probably the reason why a density of 929 and 957 kg/mr$^3$ was obtained.

CARADOL™ 3602 polyol (available from Shell) is a polyol having a nominal hydroxyl functionality of 3, an OH-value of 36 mg KOH/g, an oxyethylene content of about 77% by weight and a primary hydroxy content of about 90%. DABCO EG catalyst is an amine catalyst from Air-Products.

The polyisocyanate is a polyisocyanate having an NCO value of 26.2% by weight and which is a mixture of 1) a polyisocyanate made by reacting 42.55 pbw of MDI comprising more than 95% by weight of 4,4'-MDI and 5.05 pbw of a mixture of tripropylene glycol, propylene glycol and 1,3-butanediol (59/18.79/22.21, /w/w/w) and of 2) SUPRASEC 2020 isocyanate (52.4 pbw) (a uretonimine-modified MDI from a polyisocyanate comprising more than 95% w 4,4'-MDI having an NCO value of 29.5% by weight (available from Huntsman Polyurethanes)). Polyol 1 is a sorbitol initiated polyoxyethylene polyol having an OH value of 187 mg KOH/g and a molecular weight of 1800.

What is claimed:

1. A process for preparing a polyurethane material having no glass transition temperature below 25° C., which process comprises reacting a polyisocyanate and an isocyanate-reactive composition, optionally in the presence of water in an amount of less than 5% by weight on the below isocyanate-reactive composition, wherein the reaction is conducted at an isocyanate index of 80 to 140, the polyisocyanate consists of a) 80–100% by weight of diphenylmethane diisocyanate comprising at least 40% by weight of 4,4'-diphenylmethane diisocyanate and/or a variant of said diphenylmethane diisocyanate which variant is liquid at 25° C. and has an NCO value of at least 20% by weight (polyisocyanate a), and b) 20–0% by weight of another polyisocyanate (polyisocyanate b), and wherein the isocyanate-reactive composition consists of a) 90–100% by weight of a polyether polyol having an average nominal functionality of 3–8, an average equivalent weight of 200–2000, an average molecular weight of 600–8000, an oxyethylene (EO) content of 50–100% by weight and a primary hydroxyl content of 70–100% calculated on the number of primary and secondary hydroxyl groups in the polyol, b) a polyol chain extender and/or cross linker in an amount such that the hard block ratio is 0.60 or more and c) 10–0% by weight of one or more other isocyanate-reactive compounds excluding water, the amount of polyol a) and isocyanate-reactive compound c) being calculated on the total amount of this polyol a) and compound c).

2. The process according to claim 1, wherein the material has no glass transition temperature below 60° C., the diphenylmethane diisocyanate comprises at least 85% by weight of 4,4'-diphenylmethane diisocyanate and/or a variant of said diisocyanate which variant is liquid at 25° C. and has an NCO value of at least 20% by weight, the oxyethylene content in the polyether polyol is 75–100% by weight and the hard block ratio is at least 0.65.

3. The process according to claim 1, wherein the material has a density of more than 500 kg/m$^3$.

4. The process according to claim 2, wherein the material has a density of more than 500 kg/m$^3$.

5. The process according to claim 1, wherein the isocyanate index is 90–110.

6. The process according to claim 2, wherein the isocyanate index is 90–110.

7. The process according to claim 3, wherein the isocyanate index is 90–110.

8. The process according to claim 4, wherein the isocyanate index is 90–110.

9. A material having no glass transition temperature below 25° C., which is made according to a process that comprises reacting a polyisocyanate and an isocyanate-reactive composition, optionally in the presence of water in an amount of less than 5% by weight on the below isocyanate-reactive composition, wherein the reaction is conducted at an isocyanate index of 80 to 140, the polyisocyanate consists of a) 80–100% by weight of diphenylmethane diisocyanate comprising at least 40% by weight of 4,4'-diphenylmethane diisocyanate and/or a variant of said diphenylmethane diisocyanate which variant is liquid at 25° C. and has an NCO value of at least 20% by weight (polyisocyanate a), and b) 20–0% by weight of another polyisocyanate (polyisocyanate b), and wherein the isocyanate-reactive composition consists of a) 20–100% by weight of a polyether polyol having an average nominal functionality of 3–8, an average equivalent weight of 200–2000, an average molecular weight of 600°8000, an oxyethylene (EO) content of 50–100% by weight and a primary hydroxyl content of 70–100% calculated on the number of primary and secondary hydroxyl groups in the polyol, b) a polyol chain extender and/or cross linker in an amount such that the hard block ratio is 0.60 or more and c) 10–0% by weight of one or more other isocyanate-reactive compounds excluding water, the amount of polyol a) and isocyanate-reactive compound c) being calculated on the total amount of this polyol a) and compound c).

10. The material according to claim 9, wherein the material has no glass transition temperature below 60° C., the diphenylmethane diisocyanate comprises at least 85% by weight of 4,4'-diphenylmethane diisocyanate and/or a variant of said diisocyanate which variant is liquid at 25° C. and has an NCO value of at least 20% by weight, the oxyethylene content in the polyether polyol is 75–100% by weight and the hard block ratio is at least 0.65.

11. The material according to claim 9, wherein the material has a density of more than 500 kg/m$^3$.

12. The material according to claim 10, wherein the material has a density of more than 500 kg/m$^3$.

13. The material according to claim 9, wherein the isocyanate index is 90–110.

14. The material according to claim 10, wherein the isocyanate index is 90–110.

15. The material according to claim 11, wherein the isocyanate index is 90–110.

16. The material according to claim 12, wherein the isocyanate index is 90–110.

* * * * *